United States Patent [19]

Kock et al.

[11] Patent Number: 5,019,276
[45] Date of Patent: May 28, 1991

[54] METHOD OF AND PLANT FOR PURIFYING WATER

[75] Inventors: Bengt Kock, Sandviken; Klas Holm, Saltsjo-Boo, both of Sweden

[73] Assignee: BK Va-Leveranser AB, Sandviken, Sweden

[21] Appl. No.: 469,423

[22] PCT Filed: Oct. 6, 1988

[86] PCT No.: PCT/SE88/00514

§ 371 Date: Jun. 4, 1990

§ 102(e) Date: Jun. 4, 1990

[87] PCT Pub. No.: WO89/03239

PCT Pub. Date: Apr. 20, 1989

[30] Foreign Application Priority Data

Oct. 7, 1987 [SE] Sweden .................................. 8703856

[51] Int. Cl.$^5$ .......................... B01D 37/04; C02F 9/00
[52] U.S. Cl. ..................................... 210/744; 210/108; 210/117; 210/123; 210/136; 210/137; 210/793

[58] Field of Search ............. 210/86, 90, 93, 103–105, 210/108, 117, 123, 136, 137, 143, 199, 202, 258, 259, 266, 275–279, 793–795, 709, 744

[56] References Cited

U.S. PATENT DOCUMENTS

| | | | |
|---|---|---|---|
| 1,248,127 | 11/1917 | Jewell | 210/123 |
| 3,545,619 | 12/1970 | Ettlich et al. | 210/793 |
| 3,627,131 | 12/1971 | Goodman et al. | 210/793 |
| 4,187,175 | 2/1980 | Roberts et al. | 210/793 |

*Primary Examiner*—Ivars Cintins
*Attorney, Agent, or Firm*—Griffin Branigan & Butler

[57] ABSTRACT

The invention concerns a method of and a plant for purifying water in an open, solid filter bed (17) in which, after the addition of chemicals, the water to be purified is passed through a filter bed, said filter bed being regenerated by counter-flow flushing, wherein the water to be purified in the filter bed is caused by force to flow through the bed at a constant rate by means of a partial vacuum created by a pump means (20) arranged downstream the bed (17), the flow being kept constant with the aid of a control valve (23) arranged on the pressure side of the pump (20).

8 Claims, 1 Drawing Sheet

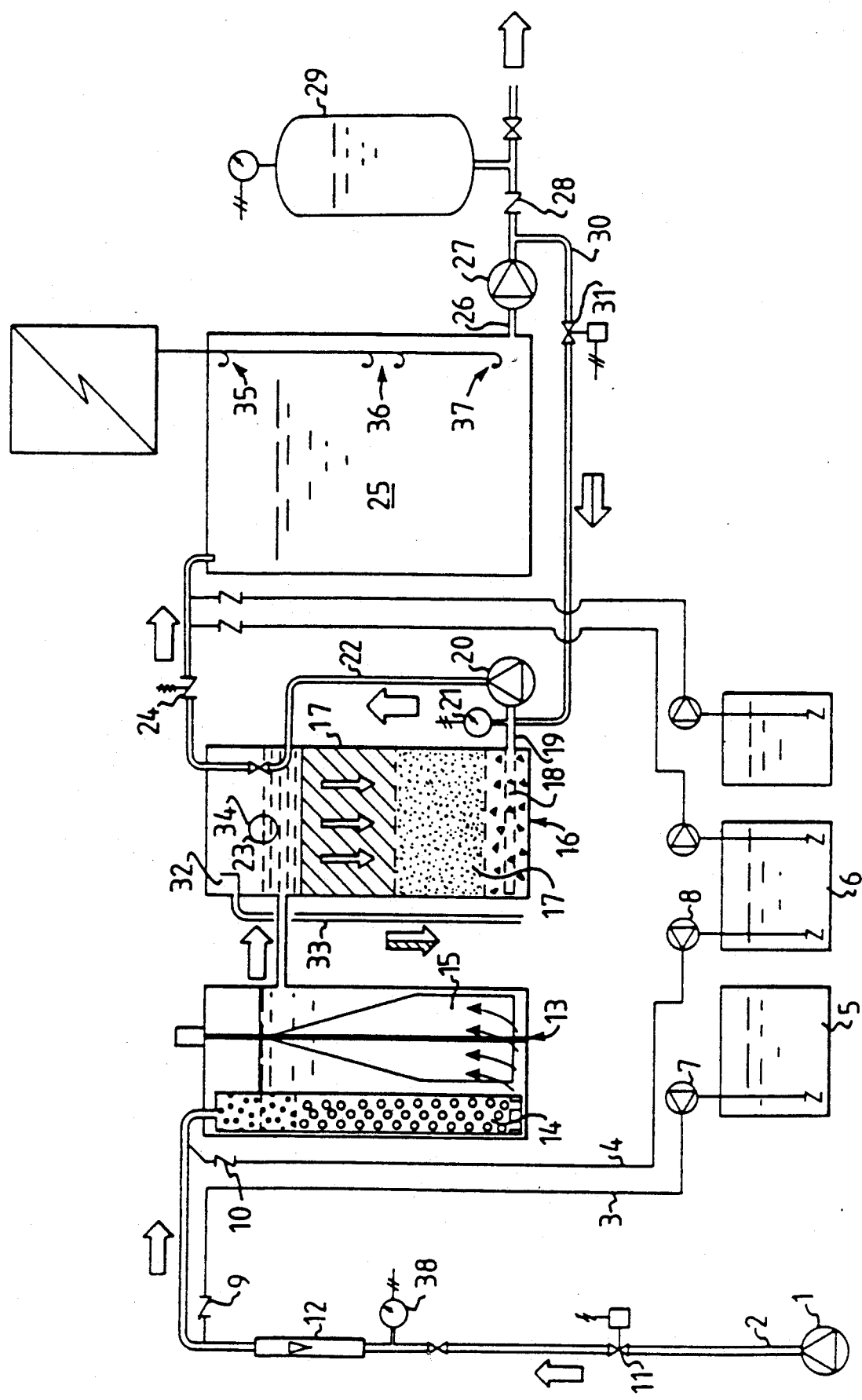

METHOD OF AND PLANT FOR PURIFYING WATER

The present invention relates to a method of purifying water in an open, solid filter bed in which, after the addition of chemicals, the water to be purified is passed through a filter bed, said filter bed being regenerated by counter-flow flushing. It also relates to plant for performing the method.

Conventional water purification using open sand filters comprises the steps of rough separation, mixing in chemicals, flocculation, sludge separation and then filtration through the sand bed. The bed is counter-flow flushed at certain intervals depending on the degree of pollution of the water entering. There are certain drawbacks to this process, one being that the water entering the sand bed must be relatively pure since the resistance caused by pollution build-up will otherwise quickly become too great for the pressure from the available water column to be able to force the water through the sand bed. Furthermore, the capacity is low, primarily because the net production, i.e. the quantity of pure water produced reduced by the quantity of flushing water, is low. The septic tanks also mean that the whole plant will require considerable space.

According to another technique pressure filters are utilized. In this case flocculation takes place after the rough separation, and the flocculated water is pumped into a pressure container in which the water is forced through the filter bed. The drawback here is that poor flocculation is obtained and that no control over the process is possible in the closed tank.

The use of continuous filters offers considerable advantages over the above methods. An example of such a filter is the CAREX filter (reg. trademark), where water is pumped into the bottom of a sand filter and forced up through the sand bed while clean sand is simultaneously added at the top and removed from the bottom of the filter. However, this type of filter is relatively complicated and is best suited to moderate volumes of water. It is far too expensive for small volumes of water, e.g. for individual households, greenhouses and the like.

The object of the present invention is to achieve a method of purifying water with the aid of an open, solid filter bed which offers high capacity and is also suitable for small quantities of water, and also to achieve a plant for performing the method, which is both reliable and economical.

This is achieved by the method according to the present invention which is characterised in that water to be purified in the filter bed is caused by force to flow through a bed at a constant rate by means of a partial vacuum created by a pump means arranged downstream of the bed, the flow being kept constant with the aid of a control valve arranged on the pressure side of the pump. The production of water is thus not dependent on a water column above the bed to force the water through the filter bed. The volume above the filter bed shall only ensure uniform distribution over the bed and that the surface of the filter bed never becomes dry.

According to a preferred embodiment of the method according to the invention, purified water is used to flush the filter bed, the supply of water being cut off when a certain predetermined partial vacuum is sensed on the suction side of the pump, and the bed is then flushed counter to the direction of flow of the water during the water purification phase.

According to another embodiment of the method according to the invention purified water is collected in separate flush and reservoir tanks or the like, control means being arranged to throttle the supply of untreated water when the tank is full, and initiate flushing of the filter bed, the flow of purified water to the flush-water tank is regulated depending on the degree of pollution of the untreated water so that when the tank is full it is time to flush the filter bed. The use of a less sophisticated control system increases operation reliability, giving a plant which is particularly suitable for projects in developing countries. Adjusting the filling rate in the flush tank to the degree of pollution in the untreated water entering ensures regular flushing of the filter bed without the risk of clogging and without risk of reduced capacity due to the bed being flushed more often than necessary.

A method according to the invention is performed in a plant comprising means for supplying untreated water, adding chemicals, performing vigorous mixing, producing floc and filtering, as well as pipes and valves for automatically conducting the water through the plant, consisting of a first pump means arranged downstream the filter bed to cause the polluted water, by means of partial vacuum, to flow through the filter bed, and is characterised by means for maintaining a constant flow through the bed, said means consisting of a float-controlled valve arranged on the pressure side of the first pump means, the float being arranged above the filter bed, whereby a set flow and a desired volume above the filter bed can be guaranteed irrespective of the degree of pollution of the filter bed. If the level rises the valve opens or throttles the out-flow if the level falls, i.e. the capacity and suction capacity of the pump is regulated depending on the degree of pollution in the bed until the set partial vacuum, i.e. the stipulated maximum degree of pollution is reached.

According to a preferred embodiment of the invention a pressure gauge is arranged downstream the filter bed to sense the resistance above the bed and is arranged, at a certain predetermined partial vacuum level, to stop the supply of untreated water and initiate flushing of the filter bed.

According to another embodiment, the means according to the invention comprises a separate flush-water tank having control means for water entering the tank and control means which, when the tank is full, are arranged to throttle the supply of untreated water and initiate flushing of the filter bed.

Additional objectives, characteristics and advantages of the present invention will be revealed in the following description of an embodiment exemplifying the invention, with reference to the accompanying drawing in which the FIGURE shows schematically a plant for performing a method according to the invention.

The drawing thus presents the flowchart for a plant for performing a method according to the invention. The parts of significance to an understanding of the invention will be described in detail below whereas conventional elements and functions will be touched upon only briefly.

The water to be purified, termed raw or untreated water, is supplied to the plant through a raw-water pump 1. Pipes 3 and 4 are connected to the raw-water pipe 2 to enable the addition of chemicals to the untreated water. The chemicals are not added until the pressure gauge 38 confirms that the water has reached it. The chemicals may be aluminum sulphate and lye to produce flocculation and adjust the pH value. These are stored in tanks 5, 6 and are dosed by means of pumps 7, 8 and valves 9, 10. The untreated water passes a control valve 11, a flow gauge 12 and continues to the mixing tank 13.

The untreated water with chemicals added is introduced at the bottom of the mixing tank by way of a vigorous mixer, consisting in the example shown of a pipe 14 filled with glass balls, for instance, so-called turbulation material, to ensure thorough mixing of the chemicals. The stirrer 15 is designed to supply energy corresponding to the shearing strength of the floc, i.e. considerable agitation at the bottom, gradually decreasing corresponding to the size of the floc. The water flows over from the top of the mixing tank to the filter vessel 16.

The filter vessel 16 contains a filter bed 17. The composition and structure of this bed shall be suited to the specific use to which the purified water is to be put. The filter bed may consist, for instance, of fine sand at the top and coarse sand at the bottom or, if the water is to be used in greenhouses, or in the case of very dirty water, an uppermost layer of hydroanthracite. However, the precise composition and structure of the bed has no bearing on the actual invention.

Substantially horizontal, perforated pipes 18 are arranged at the bottom of the filter vessel 16, through which the water which has passed the filter bed is withdrawn and flows on along the pipe 19 due to the partial vacuum generated by the pump 20. a pressure gauge is arranged in the pipe 19 on the suction side of the pump 20. In the embodiment shown this gauge is a vacuumeter 21 sensing the partial vacuum in the pipe 19. The pump 20 pumps the purified water through the pipe 22 which is provided with a float-controlled valve 23 and a spring-loaded check valve 24, to the reservoir and flush-water tank 25. The spring-loaded valve 24 has the task of preventing flush-water from passing the pump 20 while the filter bed is being flushed, when the pump 20 is not in operation.

The valve 23 with float 34 has the task, irrespective of how dirty the bed is, of limiting the flow through the bed to that stipulated, and maintaining a constant zone of liquid phase above the filter bed 17.

An outlet pipe 26 at the bottom of the tank 25 communicates via a pump 27 and check valve 28 with the system for the water leaving, in the example illustrated by a pressure tank 29. The pressure tank allows water to be withdrawn by a consumer during the flushing phase, as well as closing the check valve 28 during flushing. A feedback pipe 30 with solenoid valve 31 is arranged between said pump 27 and the check valve 28. This feedback pipe 29, constituting the flush-water pipe for counter-flow flushing of the filter bed 17, opens into the outlet pipe 19 from the filter vessel 16 on the suction side of the pipe 20.

An overflow outlet 32 is arranged at the top of the filter vessel 16, through which flush-water, together with contaminats collected in the filter bed, flows out and through the flush-water pipe 33.

Chemicals required for disinfection and adjusting the pH value are preferably added in pipe 22 after the spring-loaded valve 24. Control means 35, 36 and 37 are arranged in the reservoir and flush-water tank 25, their function being described in more detail below.

The method according to the invention is performed as follows in the plant illustrated in the drawing:

The raw-water pump 1 is started, the pressure gauge confirms that the water has reached it, chemicals are added, mixed in and the mixture allowed to remain in the mixing tank 13 long enough for flocculation to occur. It then flows over into the filter vessel 16 where a desired water level is maintained above the filter bed 17 with the aid of the float 34. Water flows, or rather is sucked through the filter bed 17 due to the partial vacuum created by the pump 20, and is carried further through the pipe 22. By influencing the valve 23, the float 34 controls the flow supplied by the pump 20.

The vacuumeter 21 senses the partial pressure in the pipe 19 leaving the filter bed. When the partial vacuum reaches a certain predetermined level, depending on the contaminats collected in the filter bed, the pump 20 will be stopped, the solenoid valve 31 opened and the pump 27 will pump water through the feedback pipe 30 and pipe 19, in through the perforated pipes 18 and up through the filter bed 17. The water is prevented by the spring-loaded valve 24 from flowing up through the pump 20 and back through the pipe 22.

The flush-water takes with it the contaminants collected in the filter bed, and flows out through the overflow outlet 32 to the flush-water outlet pipe 33.

The control means 35, 36, 37 in the reservoir and flush-water tank 25 ensure that if the water tank is filled, the raw-water pump is stopped and that it is started again when the level in the water tank has fallen to a certain level. They also prevent flushing if the water volume in the tank is insufficient to carry out flushing.

The filter bed must not be permitted to become dry on the surface since a filter head would then be formed which would dramatically reduce the flow through the filter bed as well as making it difficult to flush the bed clean.

Of course elements having a similar function can be exchanged for various elements in the plant and some elements may be omitted without essentially altering the function of the plant, without departing from the inventive concept as defined in the following claims.

We claim:

1. In a method for purifying water in an open, solid filter bed of a type in which chemicals are added to water to be purified, the water is thereafter passed through the filter bed, and the filter bed is periodically regenerated by counter-flow flushing, the improvement wherein the following method steps are included:
    creating a partial vacuum downstream of the filter bed by applying a vacuum side of a pump thereto for causing the water to be purified to flow under force of said partial vacuum through the bed at a substantially constant rate; and
    operating a control valve arranged on a pressure side of said pump for helping to keep the flow at the said substantially constant rate.

2. In a method as in claim 1 wherein said control valve is controlled by a float located upstream of said filter bed.

3. In a plant for purifying water of a type comprising a means for supplying polluted water, a means for adding chemicals to said polluted water, a means for mixing said polluted water and chemicals for thereby producing floc, and open solid filter bed to which said thusly treated polluted water is introduced at an upstream side, a first pump means arranged downstream of said filter bed whose vacuum side creates a partial vacuum thereat for causing flow of said polluted water through said filter bed, an improvement wherein is further included:
a means for helping to maintain a substantially constant flow through the filter bed, said means comprising a float control valve arranged on a pressure side of said first pump means, with said upstream side of said filter bed being above said filter bed, and a float of said float control valve being arranged at said upstream side of said filter bed for maintaining a desired liquid level above the filter bed for helping to assure a predetermined flow through said filter bed irrespective of a degree of pollution of the filter bed.

4. In a plant as claimed in claim 3, wherein is further included a pressure gauge means arranged downstream of the filter bed for sensing said partial vacuum on the vacuum side of the first pump means and for stopping the supply of polluted water and initiating flushing of the bed.

5. In a plant as in claim 4 wherein a sping-loaded check valve is arranged on the pressure side of said first pump means, downstream of the float-control valve, said spring-loaded check valve being arranged to give greater counter-flow resistance during flushing than the filter bed.

6. In a plant as claimed in claim 3, wherein a spring-loaded check valve is arranged on the pressure side of the first pump means, downstream of the float-control valve, said spring-loaded check valve being arranged to give greater counter-flow resistance during flushing than the filter bed.

7. In a plant as claimed in claim 3, wherein is further included a separate flush water tank for receiving water from said downstream side of said filter bed and control means for throttling the supply of polluted water and initiating flushing of the filter bed when said flush water tank is full.

8. In a plant as claimed in claim 3 wherein is further included a second pump means for pressurizing water leaving the plant and wherein is further included a flush means for channelling said pressurized water to said downstream side of said filter bed for flushing the filter bed with previously filtered water.

* * * * *